(12) United States Patent
Stanaland et al.

(10) Patent No.: US 12,038,095 B2
(45) Date of Patent: Jul. 16, 2024

(54) BACKWATER VALVE ASSEMBLY

(71) Applicant: Smith Industries, Inc., Montgomery, AL (US)

(72) Inventors: William Anthony Stanaland, Montgomery, AL (US); Stephen Jerald McDanal, Montgomery, AL (US)

(73) Assignee: Smith Industries, Inc., Montgomery, AL (US)

( * ) Notice: Subject to any disclaimer, the term of this patent is extended or adjusted under 35 U.S.C. 154(b) by 713 days.

(21) Appl. No.: 17/167,837

(22) Filed: Feb. 4, 2021

(65) Prior Publication Data
US 2022/0243825 A1   Aug. 4, 2022

(51) Int. Cl.
*F16K 3/02* (2006.01)
*F16K 3/10* (2006.01)
*F16K 3/18* (2006.01)
*F16K 37/00* (2006.01)

(52) U.S. Cl.
CPC .............. *F16K 3/10* (2013.01); *F16K 3/0218* (2013.01); *F16K 3/0254* (2013.01); *F16K 3/184* (2013.01); *F16K 3/186* (2013.01); *F16K 37/0041* (2013.01); *F16K 37/005* (2013.01)

(58) Field of Classification Search
CPC . F16K 3/10; F16K 3/184; F16K 3/186; F16K 31/048; F16K 3/0218; F16K 3/0254; F16K 31/05; F16K 37/0041; F16K 37/005; F16K 31/508; F16K 31/046–047; E03F 7/04; Y10T 137/7306; Y10T 137/731
See application file for complete search history.

(56) References Cited

U.S. PATENT DOCUMENTS

| | | | | |
|---|---|---|---|---|
| 1,985,078 A * | 12/1934 | Collison | ................. | F16K 3/186 251/158 |
| 2,059,635 A * | 11/1936 | Fillo | .......................... | E03F 7/04 137/392 |
| 2,330,290 A * | 9/1943 | King | ........................ | B63G 8/36 137/392 |
| 3,757,317 A * | 9/1973 | Kahn | ..................... | G01F 23/247 340/622 |
| 4,624,280 A * | 11/1986 | DePirro | .................... | E03F 7/04 137/392 |
| 4,921,207 A | 5/1990 | Baker | | |
| 5,144,975 A * | 9/1992 | Polis | .......................... | E03F 7/04 137/392 |
| 10,626,585 B1 * | 4/2020 | Sullivan | .................. | F16K 15/03 |

FOREIGN PATENT DOCUMENTS

| CN | 110043710 A | * | 7/2019 | |
|---|---|---|---|---|
| DE | 102020104242 A1 | * | 8/2021 | |
| GB | 2266943 A | * | 11/1993 | ........... F16D 27/105 |

* cited by examiner

*Primary Examiner* — Marina A Tietjen
(74) *Attorney, Agent, or Firm* — Honigman LLP; Eric J. Sosenko; Jonathan P. O'Brien (57) ABSTRACT

A backwater gate valve assembly having a gate valve movable between a closed position where the gate occludes an outlet opening and an open position where the gate valve does not occlude the outlet opening. The gate valve is coupled to a motorized actuator that is configured to move the gate valve between the open and closed positions upon sensing of a predetermined level of water in the body of the backwater gate valve assembly.

26 Claims, 8 Drawing Sheets

BACKWATER VALVE ASSEMBLY

BACKGROUND

1. Field of the Invention

The present invention generally relates to water valve assemblies. More specifically, the invention relates to a backwater valve assembly that incorporates an in-line, shut-off gate valve.

2. Description of Related Art

Backwater valve assemblies are devices that permit the free flowing of fluid in one direction. If a reverse flow of the fluid occurs as a result of downstream backpressure or blockage, for example, the backwater valve assembly may be closed to prevent flow in the reverse direction. Accordingly, backwater valve assemblies have a broad range of applications, including preventing the backing up of sewage or waste water into a building as a result of a downstream blockage in a storm water or sanitary sewer drainage system.

While backwater valves are known, such valves are manual in operation and requires attention in the event of a prolonged backup of effluent into the valve.

SUMMARY

In overcoming the various drawbacks and limitations of the related art, the present invention provides a backwater gate valve assembly configured to automatically move a gate valve between open and closed positions upon detecting of a level of fluid in the gate valve assembly above a predetermined level.

In one aspect, the backwater gate vale assembly includes a valve body having a plurality of walls defining an interior chamber, a first wall of the plurality of walls having portions defining an inlet opening in fluid communication with the chamber, a second wall of the plurality of walls having portions defining an outlet opening in fluid communication with the chamber. The valve body further includes portions defining an access opening in a top side of the valve body. A gate valve is supported in the chamber and movable between an open position and a closed position. In the closed position, the gate valve is in sealed engagement with the second wall over the outlet opening, while in the open position the gate valve is laterally spaced apart from the outlet opening. An actuator includes a motor and a linkage coupled to the gate valve, with the actuator being configured to move the gate valve between the open and closed positions. A fluid level sensor is at least partially located in the interior chamber and configured to detect a predetermined level of fluid within the chamber and to provide a signal in response to detection of fluid at the predetermined level. A controller is coupled to the fluid level sensor and to the actuator. The controller configured to move the gate valve from the open position to the closed position upon receipt of the signal from the sensor indicating fluid at the predetermined level.

In another aspect, the valve body includes a gate guide located within the chamber and cooperating with the second wall to define a guide channel, the gate valve being located within the guide channel and being movable therein relative to the gate guide between the open and closed positions.

In a further aspect, the gate guide includes a closing guide, the closing guide defining a cam surface, the gate valve being in engagement with the cam surface in the closed position.

In an additional aspect, the gate valve is supported in the chamber by an operating shaft, the operating shaft having a threaded terminal end and the gate valve being threadably engaged with the terminal end, the gate valve being rotationally limited in the guide channel, whereby the gate valve axially moves relative to the operating shaft between the open and closed positions upon rotation of the operating shaft.

In yet another aspect, the linkage is drivingly coupled to the operating shaft.

In still a further aspect, a valve position sensor coupled to the controller.

In an additional aspect, the valve position sensor is configured to sense the gate valve in the open position and the closed position.

In another aspect, the valve position sensor includes an upper valve position switch, a lower valve position switch and a switch position plate, the upper and lower valve position switches being fixedly mounted relative to the valve body and the switch position plate being movable between the upper and lower valve position switches.

In still a further aspect, the switch position plate is threadably engaged with a portion of the linkage and is non-rotatably coupled to the upper and lower switch position switches.

In yet an additional aspect, a support frame mounted to the drain body, the switch position plate being non-rotatably coupled to the frame.

In another aspect, the non-rotatable coupling includes a projection of the switch position plate received within one of a slot and recess.

In a further aspect, a valve obstruction sensor coupled to the controller, the valve obstruction sensor configured to detect an obstruction to movement of the gate valve between the open and closed positions to provide a signal to the controller in response to detecting the obstruction to movement.

In still an additional aspect, the valve obstruction sensor includes a clutch coupled to the linkage and a clutch position sensor, the clutch configured to permit relative rotational movement in the linkage in response to obstructed move of the valve gate between the open and closed positions and the clutch position sensor configured to provide a signal to the controller indicative of the relative movement in the linkage.

In yet another aspect, the clutch includes a motor coupling and a valve coupling, the motor and valve couplings having engaged mating surfaces and being movable in relative rotation.

In a further aspect, one of the motor and valve couplings is axially movable and biased into engagement with the other of the motor and valve couplings.

In an additional aspect, one of the motor and valve couplings being axially movable is non-rotationally engaged with a portion of the linkage.

In another aspect, the portion of the linkage is a drive shaft coupled to the gate valve at a location between the gate valve and the clutch.

In still a further aspect, the valve obstruction sensor further includes an upper clutch position switch, a lower clutch position switch and a clutch position plate, the clutch position plate being axially movable with the one of the motor and valve couplings between engagement with the upper clutch position switch and engagement with the lower clutch position switch.

In an additional aspect, a manually operated actuator, the manually operated actuator also being configured to manually move the gate valve between the open and closed positions.

In another aspect, the manually operated actuator is a hand wheel.

In a further aspect, the manually operated actuator is couples the motor to the linkage and includes a manual operation clutch configured to engage and disengage the linkage with the motor.

In yet an additional aspect, the manual operation clutch is spring biased and the manually operated actuator is axially movable to disengage the manual operation clutch.

In still another aspect, the manual operation clutch includes a T-slot and pin engagement between the linkage and the manually operated actuator.

In a further aspect, a downstream fluid level sensor coupled to the controller and configured to detect the level of fluid downstream of the gate valve.

In an additional aspect, the downstream fluid level sensor includes a pressure switch.

In another aspect, the pressure switch is connected to the gate valve by a hollow tube coupled to a bore extending through the gate valve.

Further objects, features and advantages of this invention will become readily apparent to persons skilled in the art after review of the following description with reference to the drawings and the claims that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Referring now to the drawings, a backwater valve assembly embodying the principles of the present invention is generally illustrated therein and designated at 10. The backwater valve assembly 10 includes, as its principal components, a valve body 12, a gate valve assembly 16 and a gate valve actuation system 18. The gate valve assembly 16 and the gate valve actuation system 18 are constructed such that they may be provided with the valve body 12 in a complete backwater valve assembly 10 or may be provided without the valve body 12 and used to retrofit a pre-existing, manually operable backwater valve into an automatic valve assembly.

The valve body 12 includes various walls (bottom, end and side walls 19, 20, 21, respectively) that define an interior chamber 22. Inlet and outlet openings 23, 25 are defined in the end walls 20 on lower portions thereof. Preferably, but not necessarily, the inlet and outlet openings 23, 25 are directly opposed to one another. On the exterior sides of the end walls 20, inlet and outlet flanges 24, 26 are provided that respectively define inlet and outlet passageways 28, 30 in communication with the inlet and outlet openings 23, 25. The inlet flange 24 of the backwater valve assembly 10 is configured to connect to a conduit (not shown) of the drainage system of the building, and the outlet flange 28 is configured to connect to a conduit (not shown) of the storm water or sanitary sewer drainage system.

The upper portion of valve body 12 is provided with an access opening 34 into the interior chamber 22 and about which, on the exterior of the valve body 12, is provided an access flange 32. As further discussed below, the gate valve assembly 16 and gate valve actuation system 18 cooperate and connect with one another through the access opening 34 of the access flange 32. A top plate 35 is received within the access flange 32 over the access opening 34 and is secured to the valve body 12 by fasteners, such as bolts, not shown.

Optionally, the backwater valve assembly 10 may include a flapper valve associated with the inlet opening 23. In one preferred embodiment, the flapper valve includes a hollow body portion that is mounted in the inlet opening 23. As such, the body portion may be a conduit structure that cooperates with the inlet opening 23 and inlet passageway 28 to define the passage into the interior chamber 22. The flapper valve may also include a flapper plate that is pivotally connect to the body portion by a pivot arm at a pivot connection. Preferably, the pivot connection is located on an upper side of the body portion in the installed orientation. As will be appreciated, the flapper valve operates as a check valve capable of pivoting between an open position and closed position. During the inflow of fluid, as indicated by arrow (F), the flapper valve 38 is moved into the open position under the force of fluid flowing from the building to the storm water/sanitary sewer drainage system. When the inflow stops, the flapper valve moves to the closed position where it sealingly engages the body portion and prevents fluid, as well as gas, from flowing in reverse, in a direction opposite of arrow (F), from the interior chamber 22 back into the building. With the pivot connection being located on the upper part of the body portion, opening and closing of the flapper valve occurs under the influence of fluid flow and gravity.

As mentioned above, the backwater valve assembly 10 includes a gate valve assembly 16. The gate valve assembly 16 is provided to enable a more permanent closure of the valve assembly 10, one that is not dependent on the flow. Non-limiting examples of when a more permanent closure of the backwater valve assembly 10 might be desired include servicing of the building's drainage system and prolonged flooding of a storm water drainage system.

The gate valve assembly 16 includes a gate valve 44 that is movable between an open or raised position and a closed or lowered position. In the closed position, the gate valve 44 occludes and closes off the outlet opening 30. In the open position of the gate valve 44, the outlet opening 30 is unimpeded by the gate valve 44. To aid in directing movement of the gate valve 44, a gate guide 46 is provided on the opposing side walls 21 of the valve body 12 in the form of flanges or ribs extending inward from the opposing side walls 21. The gate guide 48 includes opening guides 48 and closing guides 50. The opening guide 48 directs the gate valve 44 vertically, which is transverse relative to the outlet opening, generally as the valve gate 44 is being move to and from the open position. The opening guides 48 extend upward in a linear fashion, generally perpendicular to the flow direction F and the axis of the outlet opening 30 and are positioned on the side walls 21 at a located above the outlet opening 30. The closing guides 50 of the gate guide 46 are located lower on the side walls 21, generally beneath the opening guides 48 and are positioned to contact the gate valve 44 as it is lowered into the closed position. This contact, as further discussed below, forces the gate valve 44 into sealing engagement with the end wall 20 over the outlet opening 30.

In the illustrated embodiment, the gate valve 44 is composed of a blade 56, a head 58 and side braces 59. The blade 56 is configured to generally lie flat against the end wall 20 defining the outlet opening 30 (hereafter "the outlet side end wall 20") and is slidable there along between the open and closed positions. The head 58 of the gate valve 44 extends perpendicular from the upper end of the blade 56. The side braces 59, which are triangular in shape, connect the head 58 to the blade 56 along the side edges of the blade 56. Being triangular in shape, the side braces 59 generally provide the gate valve 44 with a wedge shaped structure.

The gate valve 44 is non-rotatably retained in the chamber 22 as a result of the gate guide 46 forming a guide channel 54 with the outlet side end wall 21. As seen in the figures, the side ends of the head 58 and the side braces 59 are positioned in the channel 54. As such, the gate valve 44 can axially slide, in a vertical direction, within the channel 54 and the valve body 12, but cannot rotate within the channel 54 and valve body 12, the inward extension of the gate guide 46 and the outlet side end wall 20 inhibit that latter movement.

In order to drive and move the gate valve 44 in the channel 54, the gate valve assembly 16 is formed in the manner of a lead screw with an operating shaft 60 extending through a threaded bore 64 formed through the head 58 of the gate valve 44. The terminal end of the operating shaft 60 is provided with a screw thread 62 that is matingly engaged with the threaded bore 64. Upon rotation of the operating shaft 60 by the gate valve actuation system 18, the gate valve 44 is prevented from rotating, as discussed above, and the engagement between the screw thread 62 and the threaded bore 64 causes the gate valve 44 to axially move along the operating shaft 60, being advanced or retracted depending on the direction of rotation of the operating shaft 60.

The operating shaft 60 is rotated by the gate valve actuation system 18 through a linkage 66 coupled to a gearbox 68 driven by a drive motor 70, which may be an angle-type DC motor. The drive motor 70 is in turn coupled to a controller 72, and the controller 72 is connected to one of more sensors, such as fluid level sensor 73, a valve position sensor 84, a valve obstruction sensor 102 and a downstream water level sensor 142.

The fluid level sensor 73 includes a fluid level detection device, such as a float switch 74, positioned within the interior chamber 22. In one embodiment, the float switch 74 may be vertically suspended in the interior chamber 22 on the end of a height adjustable conduit 75 adjustably mounted to the top plate 35 using a lock nut arrangement, or other height adjustable means, to position the float switch 74 at a predetermined height selected to correspond to an unaccepted level of fluid within the backwater valve assembly 10 and indicative of fluid not draining through the valve assembly 10. The float switch 74 may alternatively be freely suspended within the interior chamber 22 at the predetermined height to interact with the effluent. Float switches 74 are well known in the industry and as used herewith may be of common or know construction. Accordingly, further detailed discussion or operation thereof is not provided herein.

Figure 1:
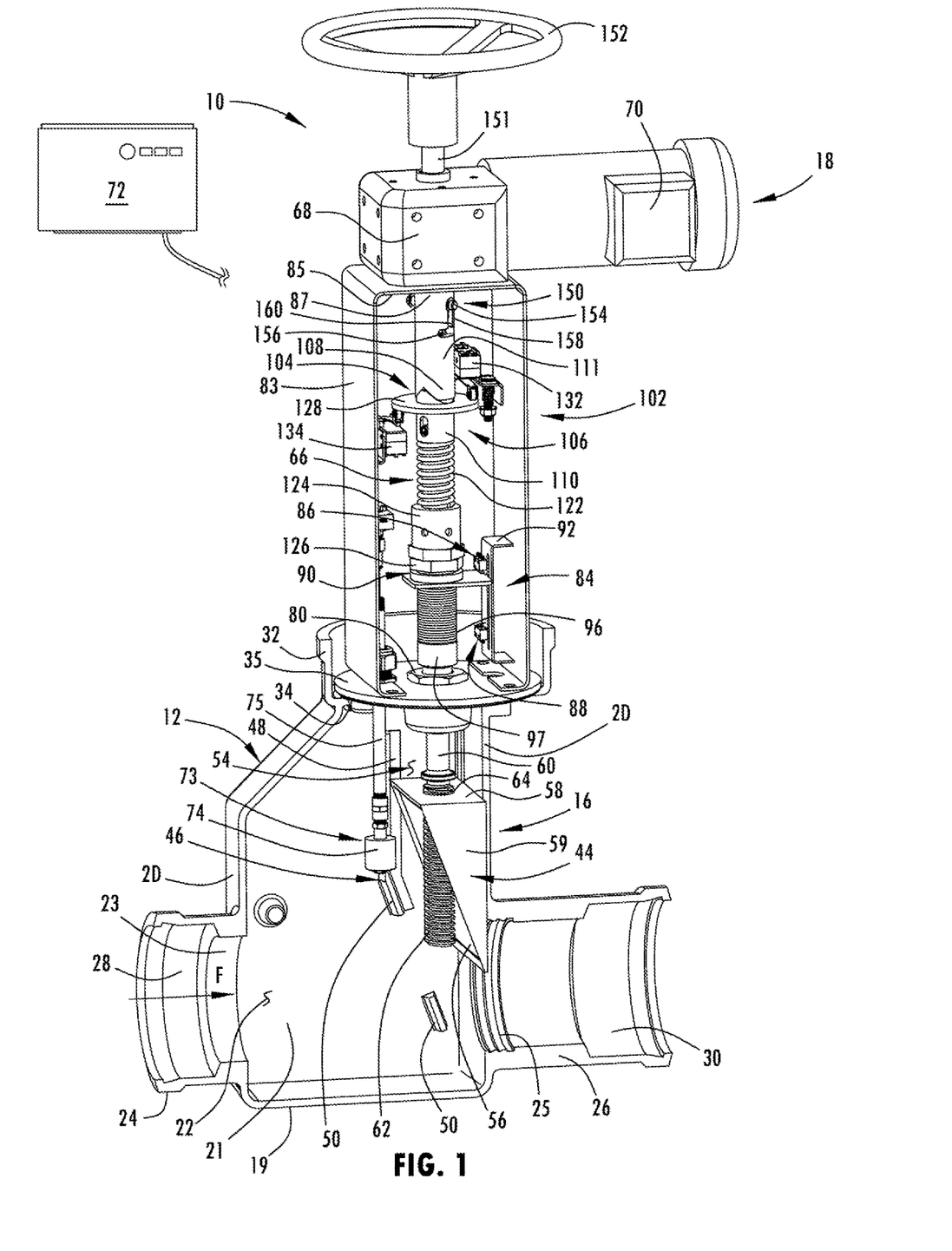
FIG. 1 is a cross-sectional view of a backwater valve assembly embodying the principles of the present invention with a gate valve in an open position.
Figure 2:
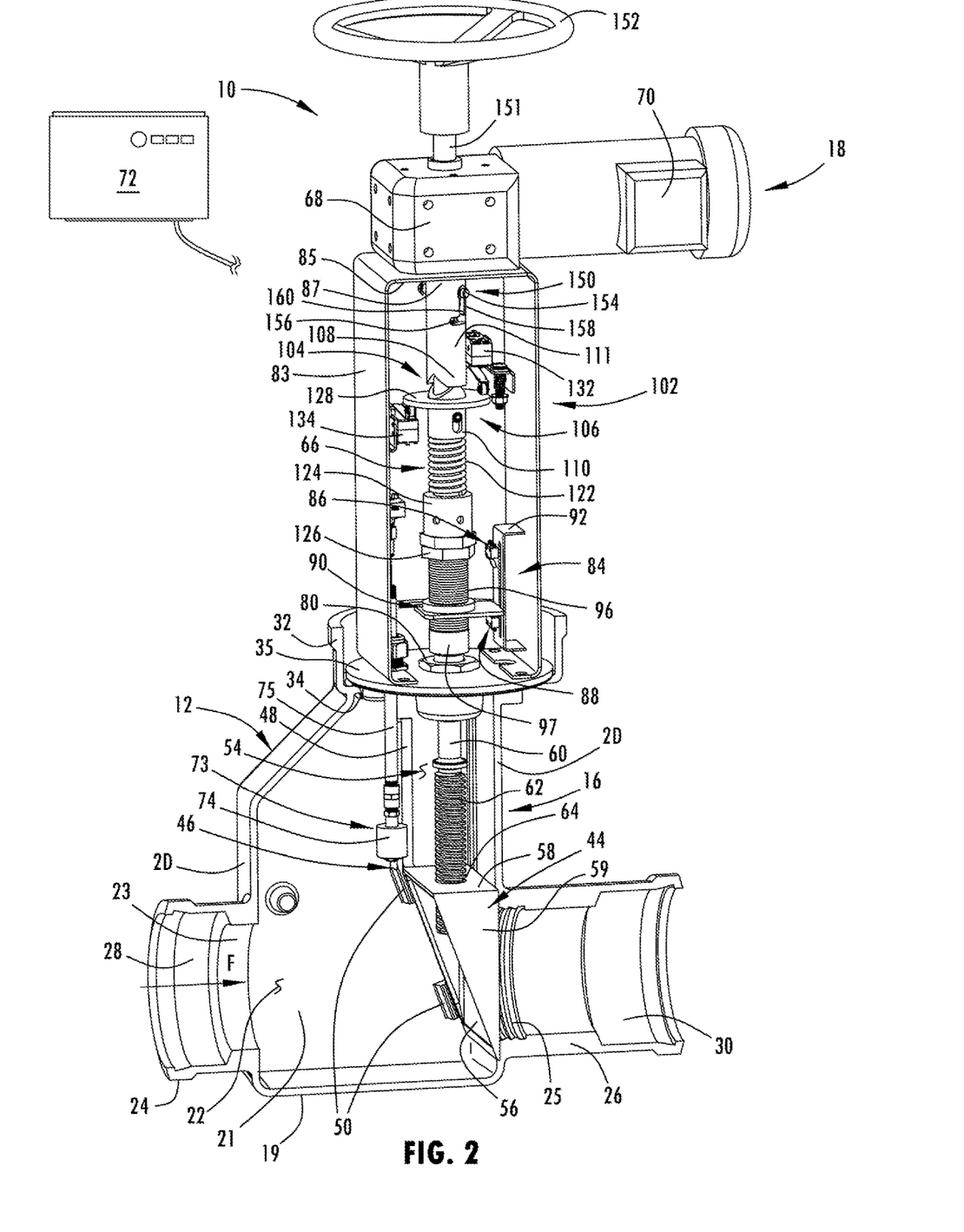
FIG. 2 is a cross-sectional view of the backwater valve assembly seen in FIG. 1 with the gate valve in closed position.

During the situation where fluid (waste water or other effluent) is backed up into the interior chamber 22, the float switch 74 detects the increased height of the effluent within the interior chamber 22 and, upon reaching the predetermined height, provides a signal to the controller 72. In response, the controller 72 energizes the motor 70 driving the gearbox 68 and rotating the linkage assembly 66 and the operating shaft 60. The gate valve 44, which is normally in the retracted or raised position seen in FIG. 1, is resultantly caused to be advanced and lowered. As the gate valve 44 is lowered and substantially in registry over the outlet opening 30, a perimeter edge of the side braces 59 (the edge forming the hypotenuse of its triangular shape) contacts the closing guides 50, which are similarly angled with respect to the blade 56. The closing guides 50 operate as cam surfaces and, as the gate valve 44 continues to be lowered, wedge the gate valve 44 between the closing guides 50 and the outlet side end wall 20 to sealingly engage the blade 56 with the outlet side end wall over the outlet opening 30, thereby closing the outlet opening 30.

As mentioned above, the top plate 35 is secured over the access opening 34 of the valve body 12. Provided in the top plate 35 is a threaded central bore 76. An upper end 78 of the operating shaft 60 extends through the central bore 76 and is supported by a packing nut 80 threadably engaged in the central bore 76. The upper end 78 of the operating shaft 60 is non-rotatably engaged and retained with a lower end 82 of the linkage assembly 66. This engagement may by any well-known means, including a pinned engagement, threaded engagement or socket engagement.

The linkage assembly 66 is generally enclosed within a mounting frame 83 that is secured to the top plate 35 (preferably by threaded fasteners) to support the drive motor 70 above the valve body 12. In a preferred embodiment, the drive motor 70 is mounted to an upper end wall 85 of the mounting frame 83 and the upper end 87 of the linkage assembly 66 extends through the end wall 85 and into the gear box 68 where it is coupled to the drive motor 70.

Figure 3:
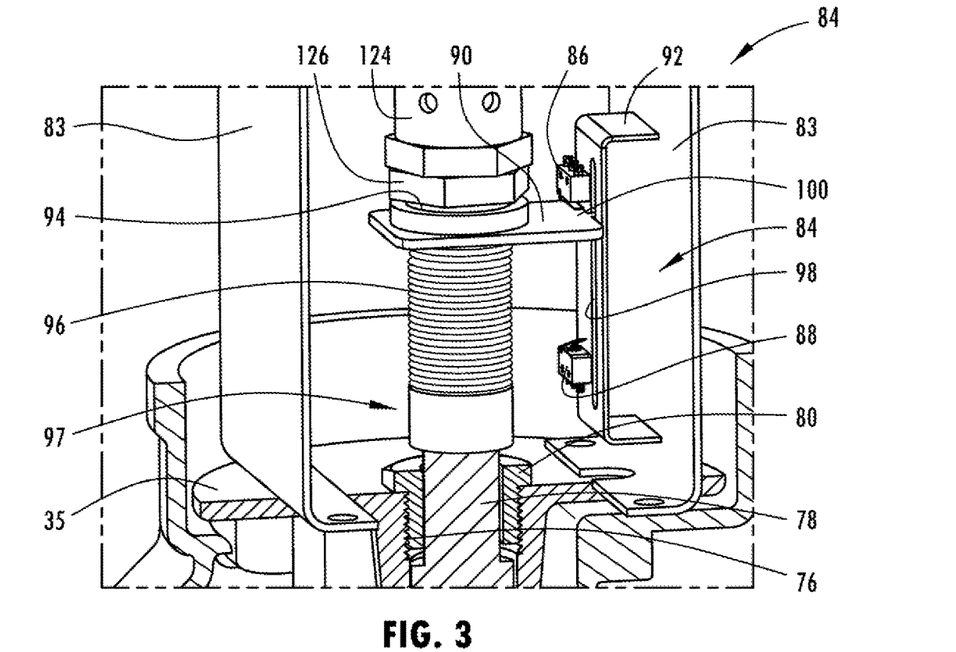
FIG. 3 is an enlarged view of the valve position sensor of the backwater valve assembly when the valve gate is in the open position.
Figure 4:
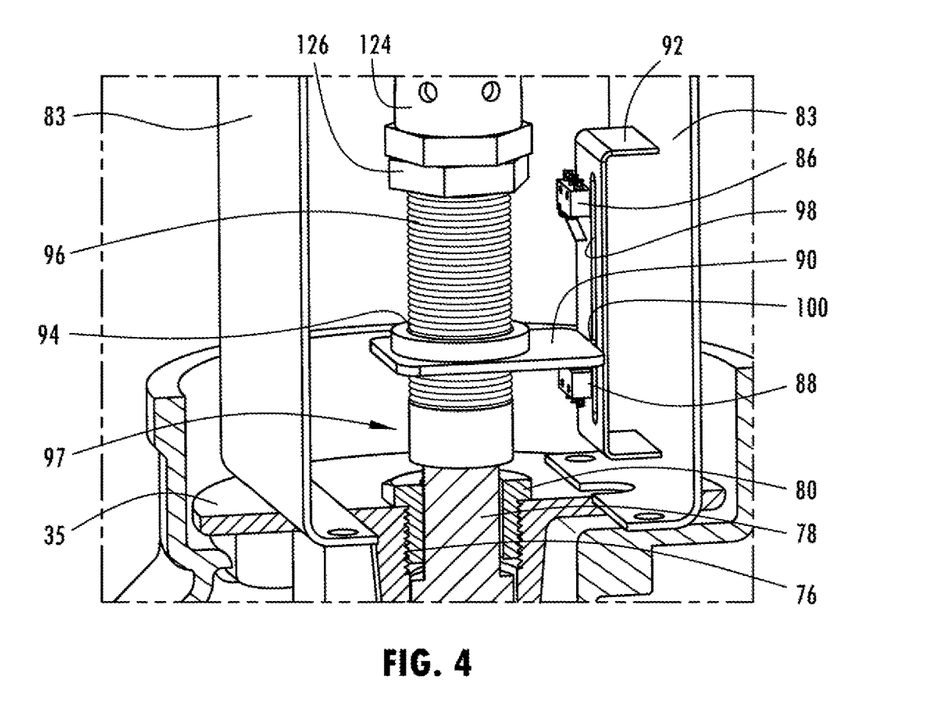
FIG. 4 is an enlarged view of the valve position sensor when the valve gate is in the closed position.

As further seen in FIGS. 3 and 4, provided at the lower end of the linkage assembly 66 is the valve position sensor 84. It is noted that this positioning of the valve position sensor 84 is optional and the valve position sensor 84 may alternatively be position at the upper end of the linkage assembly 66 or at an intermediate position. The valve position sensor 84 provides a signal the controller 72 indicating the position of the gate valve 44 as further discussed below.

The valve position sensor 84 includes an upper valve position switch 86, a lower valve position switch 88, a switch position plate 90 and a guide bracket 92. As illustrated, the guide bracket 92 is mounted to an interior surface of the mounting frame 83 and supports the upper and lower valve position switches 86, 88 at locations vertically spaced apart from one another. The switch position plate 90 is provided with a lead screw construction includes a threaded bore 94 on one end of the plate 90 and is supported by threaded engagement between the bore 94 and a correspondingly threaded portion 96 provided on a drive shaft 97 of the linkage assembly 66, adjacent to the guide bracket 92. Mounted to the linkage assembly 66 in this manner, the switch position plate 90 extends laterally from the drive shaft 97 toward the guide bracket 92 and engages the guide bracket 92. The engagement between the switch position plate 90 and the guide bracket 92 prevents the switch position plate 90 from rotating with the drive shaft 97.

To prevent rotation of the switch position plate 90 with the drive shaft 97, the guide bracket 92 includes a vertically oriented slot 98 that receives a nib 100 or protrusion on the end of the switch position plate 90, opposite from the threaded bore 94. The slot 98 is adjacent to and generally extends between the upper and lower valve position switches 86, 88. During rotation of the drive shaft 97, because the switch position plate 90 is prevented from rotating therewith, the switch position plate 90 will be caused to move vertically (axially) along the threaded portion 96, either up or down depending on the direction of rotation, by virtue of the lead screw construction.

As seen in FIG. 3, the switch position plate 90 is initially located on to the threaded portion 96 to engage with the upper valve position switch 86 when the gate valve 44 is in the open position, as seen in FIG. 1. In this position, the switch position plate 90 closes the upper valve position switch 86 and a signal is sent to the controller 72 indicating that the gate valve 44 is in its open position. As the gate valve 44, is lowered by rotation of the operating shaft 60, the switch position plate 90 is correspondingly lowered by rotation of the threaded portion 96 and the drive shaft 97. When the gate valve 44 reaches its closed position over the outlet opening 30, the switch position plate 90 has been moved to a position where it correspondingly engages and closes the lower valve position switch 88. The closed switch 88 sends a signal to the controller 72 indicating that the gate valve 44 is now in the closed position. Moving the gate valve 44 back to its open position also moves the switch position plate 90 back into engagement with the upper valve position switch 86, resulting in the controller 72 receiving a signal indicating that the gate valve 44 is in its open position.

Figure 5:
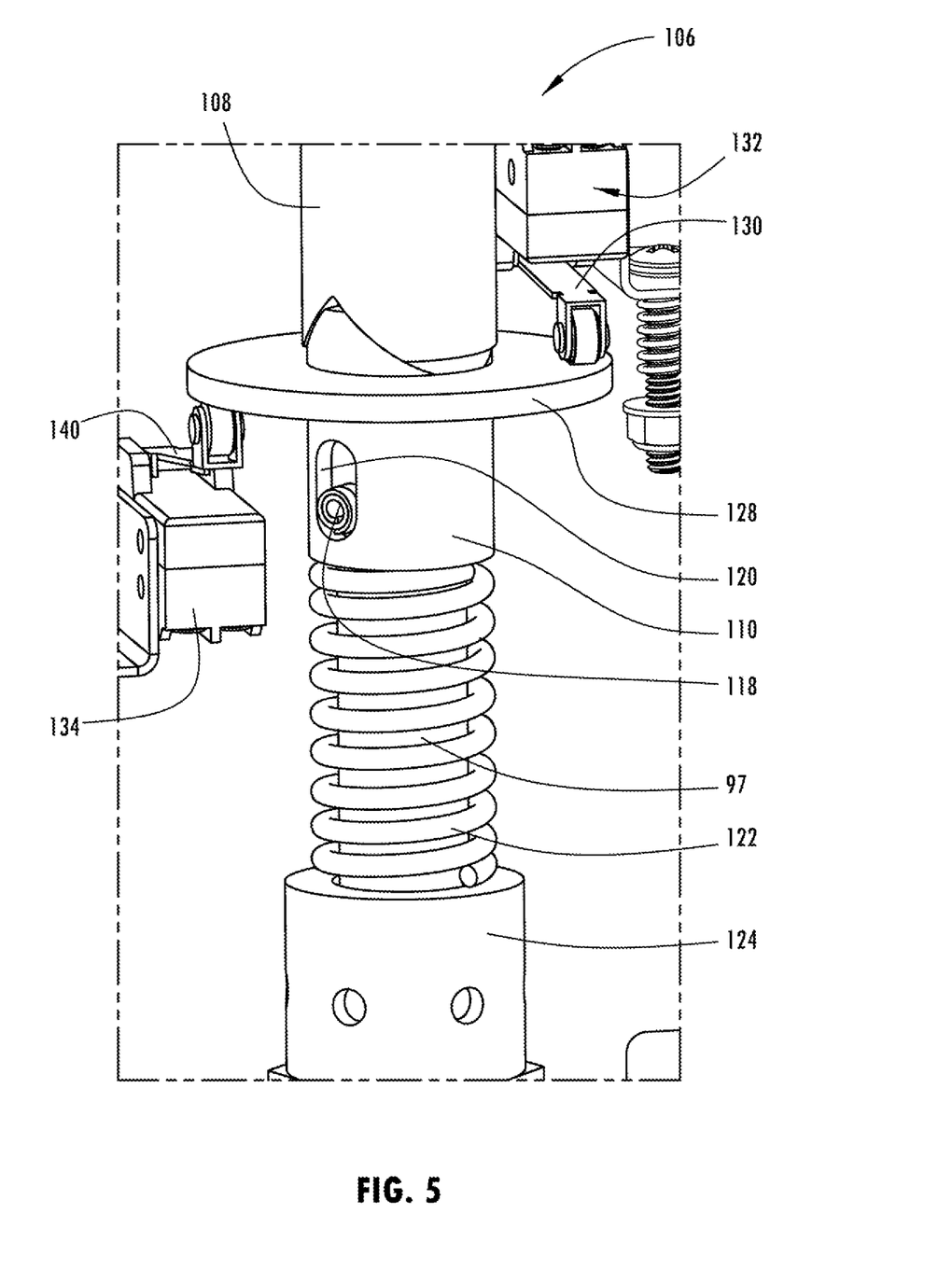
FIG. 5 is an enlarged view of the valve obstruction sensor of the backwater valve assembly during normal, unobstructed operation of the valve assembly.
Figure 6:
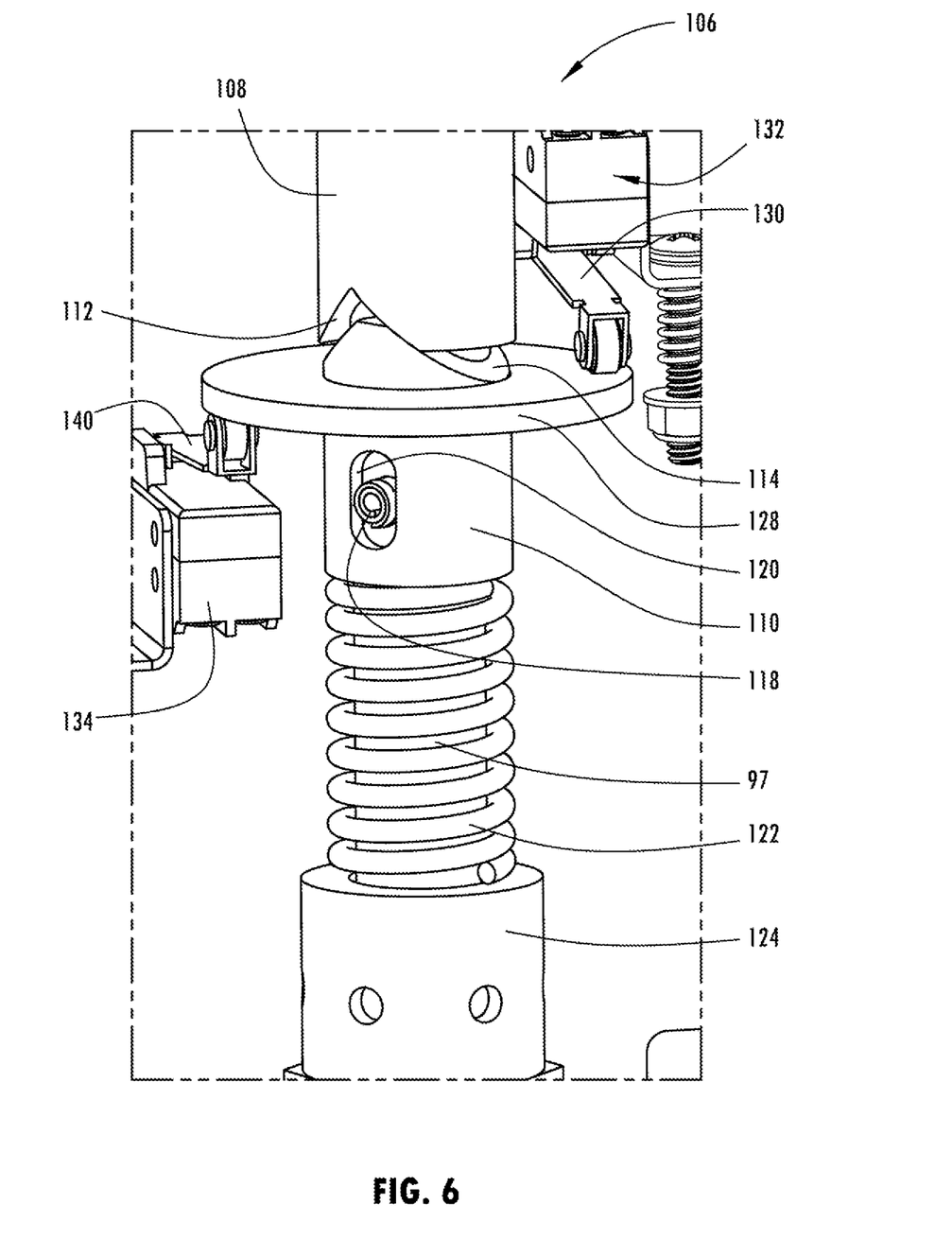
FIG. 6 is an enlarged view of the valve obstruction sensor when the gate valve is in the closed position.
Figure 7:
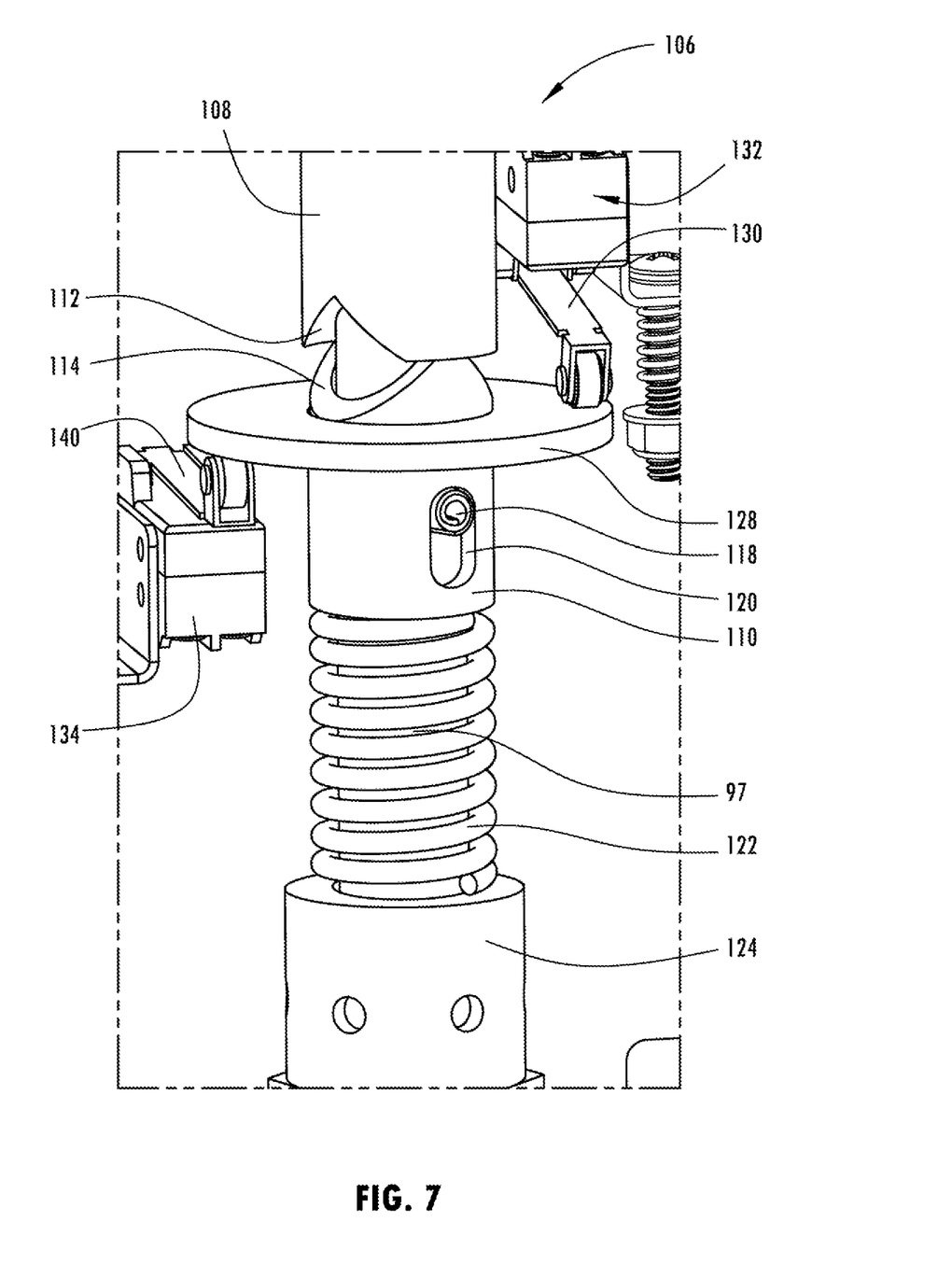
FIG. 7 is an enlarged view of the valve obstruction sensor when movement of the gate valve is obstructed, either as a result of blockage by debris or by a malfunction of the valve assembly.

Referring now to FIGS. 5-7, the valve obstruction sensor 102 and its operation is generally illustrated therein. As illustrated, the valve obstruction sensor 102 is integrated into the linkage assembly 66 and is generally composed of a clutch 104 in combination with a clutch position sensor 106. The clutch 104 and clutch position sensor 106 cooperate to prevent damage to the operating shaft 60 or the linkage assembly 66 in the event of high torque, resulting from an obstruction blocking movement of the gate valve 44 during either closing or opening of the gate valve 44. The clutch 104 will allow for slippage in the drive line of the various components, while the clutch position sensor 106 will cause stopping of the drive motor 70 and issuance of an error or obstruction signal, such as through a light and/or audible alarm.

The clutch 104 includes two clutch couplings, a motor coupling 108 and a valve coupling 110. The motor coupling 108 is provided as an end of an input shaft 111 that is coupled so as to be rotationally driven by the gear box 89 of the drive motor 70. The valve coupling 110 is coupled so as to rotationally drive the operating shaft 60 and effectuate movement of the gate vale 16 and its gate valve 44. The motor coupling 108 and the valve coupling 110 respectively include mating surfaces 112, 114 that, during normal closing and opening of the gate valve assembly 16 operate to allow the motor coupling 108 to rotationally drive the valve coupling 110 without relative movement between the two clutch couplings.

The valve coupling 110 is supported on a drive shaft 97 of the linkage assembly 66. As will be appreciated from FIGS. 3 and 4, the drive shaft 97 is that portion of the linkage assembly 66 that component on which the threaded portion 96 is formed and which is in driving engagement with the operating shaft 60.

The means by which the valve coupling 110 is supported on the drive shaft 97 is one that allows for axial movement of the valve coupling 110 relative to the drive shaft 97, but prevents rotational movement with respect to the drive shaft 97. In one implementation, this is achieved via a pin and slot engagement. As seen in FIG. 5, a pin 118 extends from drive shaft 97 into an axial slot 120 formed in the valve coupling 110.

A biasing member, such as a coil spring 122, is located about the drive shaft 97 and biases the valve coupling 110 into engagement with the motor coupling 108, disposing the pin 118 in the lower end of the axial slot 120. The biasing force exerted by the spring 122 on the valve coupling 110 correlates to the torque required for slippage between the mating surfaces 112, 114 of the clutch couplings and may be increased or decreased through axial positioning of a spring pressure adjustment nut 124, which is mounted on the previously mentioned threaded portion 96. Moving the adjustment nut 124 axially toward the valve coupling 110 compresses the spring 122 between the adjustment nut 124 and the valve coupling 110, thereby increasing the biasing force. Opposite movement of the adjustment nut 124, accordingly, decreases the biasing force. A lock nut 126 (seen in FIGS. 3 and 4) may also be provided on the threaded portion 96 to engage the adjustment nut 124 and thereby set the slipping torque at the desired amount.

During normal operation (closing and opening) of the gate valve assembly 16, the mating surfaces 112, 114 are fully seated with one another and torque is transferred from the motor coupling 108 to the valve coupling 110 causing rotation of the drive shaft 97 and movement of the gate valve 44.

Carried by the valve coupling 110 is a clutch position switch plate 128. In the fully seated position of the motor coupling 108 and valve coupling 110, the clutch position plate 128 depresses a switch arm 130 of an upper clutch position switch 132 closing the switch 132. With the upper clutch position switch 132 closed, a signal is sent to the controller 72 indicating that the valve gate 16 is operating normally. In this position, a lower clutch position switch 134, further discussed below, is in an open, unactivated position.

Upon the gate valve 44 being fully lowered into its closed and sealed position, where it is forced into engagement with the end wall 20 over the outlet opening 30 by the closing guide 50, torque applied between the mating surfaces 112, 114 will increase. The pressure exerted by the spring 122 on the valve coupling 110 is set to allow slippage between the mating surfaces 112, 114 of the clutch 104 at an increased and predetermined torque that is associated with the closed and sealed position of the gate valve 44. Once this predetermined closing torque is reached, the mating surfaces 112, 114 will slip, allowing the motor coupling 108 to move relative to the valve coupling 110. To facilitate this slippage, each of the mating surfaces 112, 114 on the ends of the couplings 108, 110 is formed as a pair of mirrored, oblique or ramped surfaces. As will be readily appreciated, a variety of shapes may be provided for the mating surfaces 112, 114.

Upon relative rotation and slipping, between the motor coupling 108 and the valve coupling 110, the valve coupling 110 is moved axially downward along the drive shaft 97 against the force of the spring 122, as seen in FIG. 6. As further seen in FIG. 6, when the valve gate 114 is in the fully closed and sealed position, the mating surfaces 112, 114 are still partially engaged and axial movement of the valve coupling 110 is sufficient to cause the clutch position plate 128 to release the switch arm 130 of the upper clutch position switch 132, thereby opening the switch 132. With the upper clutch position switch 132 open, and the lower valve position switch 88 in the closed position as discussed above, signaling that the gate valve 44 has been fully lowered and has sealed off the outlet opening 30, the logic of the controller 72 determines the valve gate 16 is in the fully closed and sealed position and shuts off power to the drive motor 70.

Where an obstruction prevents the gate valve 44 from being fully lowered, the lower valve position switch 88 will not be in closed position, but increased torque will be experienced in the clutch 104. In this instance the torque will exceed the predetermined closing torque and the drive motor 70 will continue to rotate the motor coupling 108. As the torque continues to increase, the slippage of the clutch 104 will also increase. This slippage increases to a point where the motor coupling 108 has moved past the position seen in FIG. 6 and into the position seen in FIG. 7. In this position, the mating surfaces 112, 114 have been rotated past each other and are disengaged in favor of engagement between flat end surfaces 136, 138 of the motor coupling 108 and valve coupling 110. At this point, the valve coupling 110 has been moved its full, downward axial extent, as indicated by the position of the pin 118 in the upper end of the slot 120. Also, the switch arm 140 of the lower clutch position switch 134 has been fully engaged by the clutch position plate 128, thereby closing the lower clutch position switch 134. Upon closing of the lower clutch position switch 134, in conjunction with the lower valve position switch 88 being in an open state, the logic of the controller 72 determines that an obstruction or malfunction is preventing the gate valve 44 from closing off the outlet opening 30. In response, the controller 72 cuts power to the drive motor 70, stopping rotation of the input shaft 111 of the linkage assembly 66, and generates an operation error signal, such as an audible, visual or digital alarm.

The torque at which the clutch position plate 128 is brought into engagement with the switch arm 140 of the lower clutch position switch 134 (the error torque) is set so as to avoid damage to the various components of the backwater valve assembly 10, such as the input shaft 111, drive shaft 97 or operating shaft 60. This torque, which will be higher than the valve closing torque, is set to be lower than the breaking torque of the various components of the linkage assembly 66 and the gate valve assembly 16, but higher than the operating torque and the valve closing torque. The specific torque for set as the error torque will depend on the design criteria of the particular backwater valve assembly 10.

Figure 8:
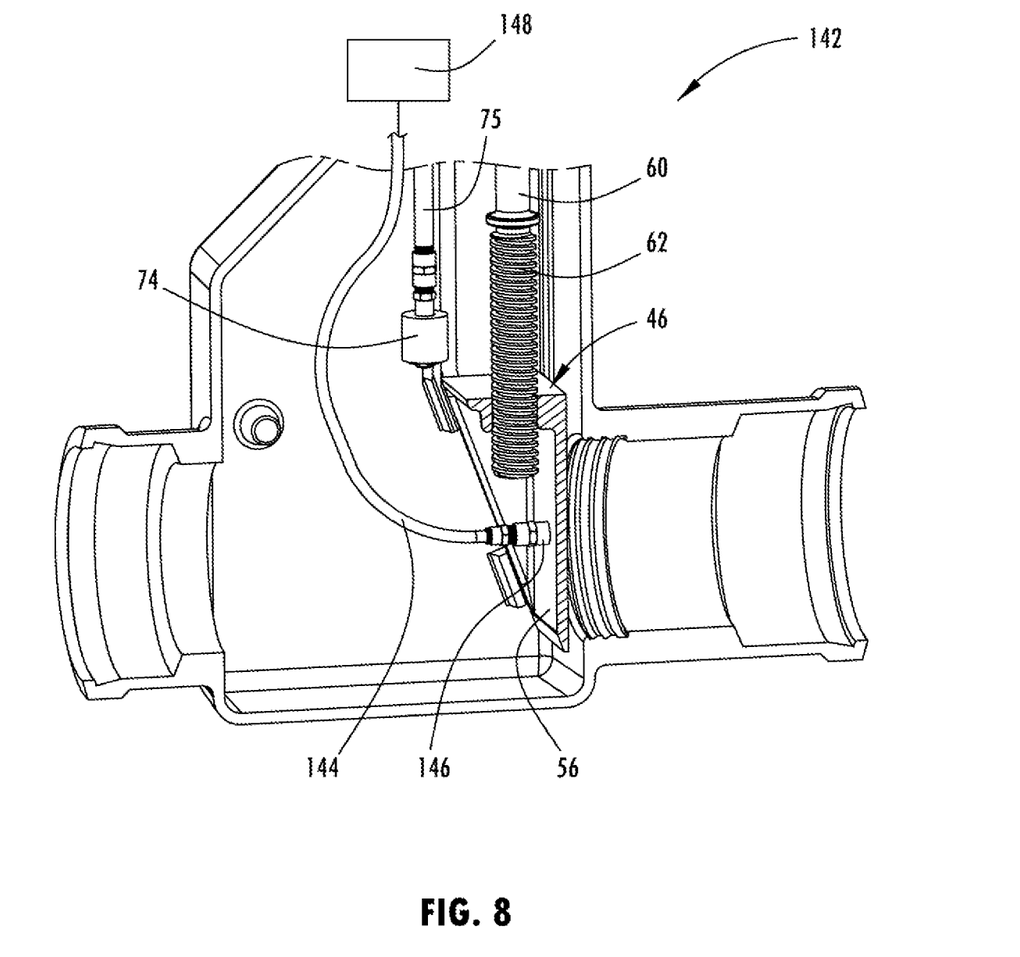
FIG. 8 is an enlarged view of the downstream water level sensor of the backwater valve assembly for detecting when backflow downstream of the valve assembly is no longer present.

Optionally, the backwater valve assembly 10 may include a downstream water level sensor 142. In one such implementation, the downstream water level sensor 142 may indirectly detect the level of water downstream of the valve assembly 10 through a pressure sensor. As seen in FIG. 8, a pressure conduit or tube 144 is connected to fitting 146 provided in an aperture through the blade 56 of the gate valve 44. The opposing end of the tube 144 is connected to a pressure switch or sensor 148, which is in turn connected to the controller 72. If pressure above a baseline pressure during normal operation of the valve assembly 12 is detected, the controller 72 maintains the gate valve assembly 16 in the fully closed and sealed position. If the base line pressure is detected, the controller 72 operates the drive motor 70 in reverse, causing the gate valve 44 to be raised opening the outlet opening and the valve assembly 10.

During opening of the valve assembly 10, it will be appreciated that the valve obstruction sensor 102, including the clutch 104 and clutch position sensor 106 may be utilized to determine if an obstruction is preventing the gate valve assembly 16 from being fully retracted and opened. In such a situation, the error torque will be exceeded, triggering the lower clutch position switch 134 while the upper valve position switch 86 remains open. In response the controller 72 may again cut off power to the drive motor 70 to prevent damage to the assembly 10.

Figure 9:
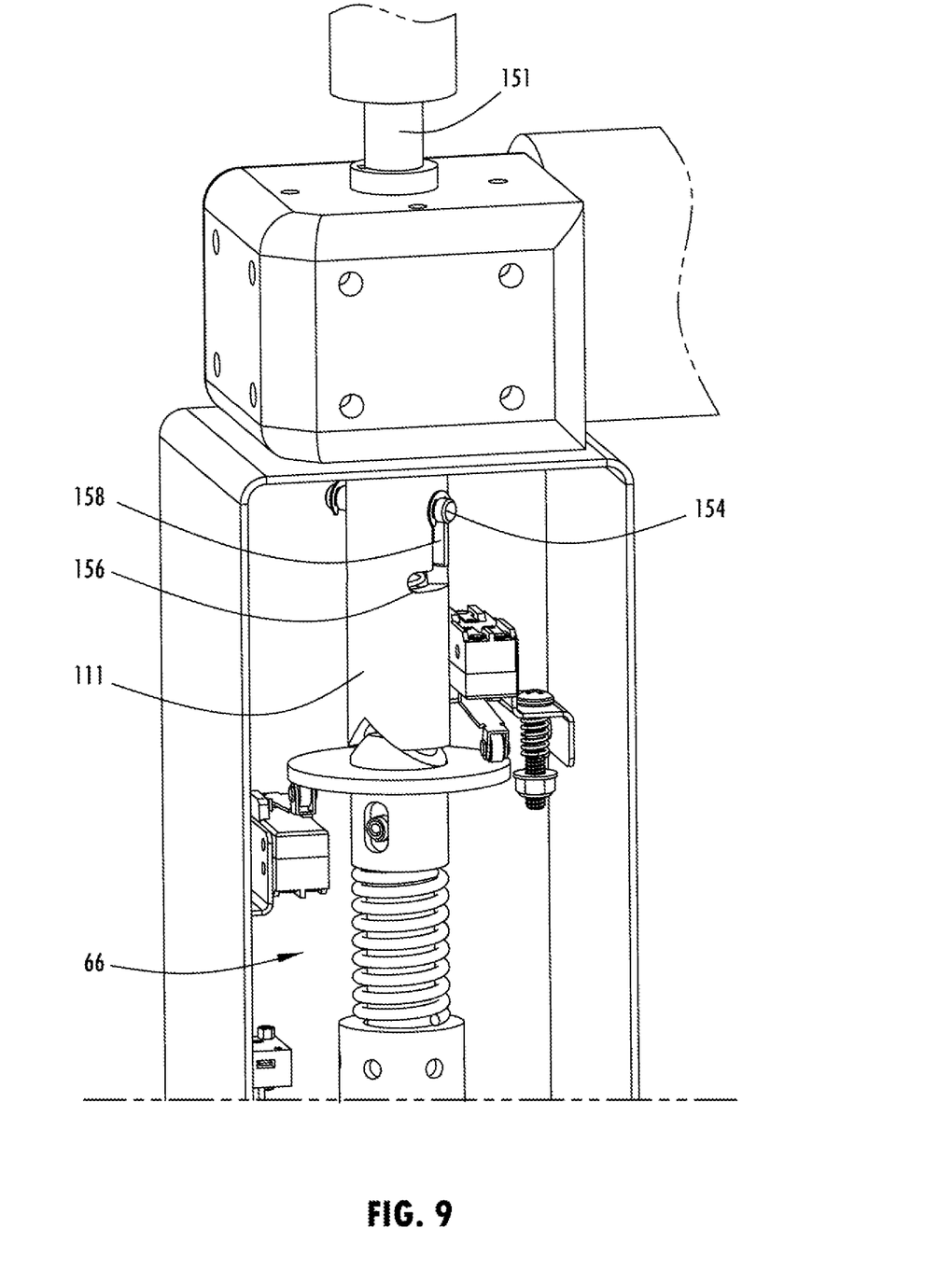
FIG. 9 is an enlarged view of the manual override feature of the backwater valve assembly.

Optionally, the backwater valve assembly 10 may provide for manual manipulation of the gate valve assembly 16 in the event of a power outage. In this regard, the linkage assembly 66 may include a manual operation clutch 150, which engages the output 151 of the hand wheel 152 with the input shaft 111 of the linkage assembly 66. Internally, the manual operation clutch 150 may spring bias the output 151 and hand wheel 152 into an upper position where the output 151 is in keyed or geared engagement with and driven by the gearbox 68. By depressing the hand wheel 84 against the biasing force, the output 151 disengages from the gear box 68 and is manually rotatable. Rotation of the hand wheel 152 causes a pin 154 to be moved into one side of the cross portion 156 of a T-slot 158. In the cross portion 156, the manual operation clutch 150 is held in an engaged position and rotation of the hand wheel 152 will cause lowering or raising of the gate valve assembly 16, as generally discussed above. In the disengaged position of the manual operation clutch 150, the pin 154 is in the central leg 160 of the T-slot 158, biased upward by the spring, and the output 151 is in keyed engagement with the gearbox 86. Accordingly, torque can be transmitted from the gearbox 86, to the output 151, through the pin 154 and to the input shaft 111 of the linkage assembly 66.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

We claim:

1. A backwater gate valve assembly comprising:
a valve body having a plurality of walls defining an interior chamber, a first wall of the plurality of walls having portions defining an inlet opening in fluid communication with the chamber, a second wall of the plurality of walls having portions defining an outlet opening in fluid communication with the chamber, the valve body further including portions defining an access opening in a top side of the valve body;
a gate valve supported in the chamber and movable between an open positon and a closed position, in the closed position the gate valve being in sealed engagement with the second wall over the outlet opening, in the open positon the gate valve being laterally spaced apart from the outlet opening;
an actuator including a motor and a linkage coupled to the gate valve, the actuator configured to move the gate valve between the open and closed positions;
a fluid level sensor at least partially located in the interior chamber and configured to permit a first predetermined level of liquid flow through the gate valve assembly and to detect a second predetermined level of liquid within the chamber and to provide a signal in response to detection of liquid at the second predetermined level; and
a controller coupled to the fluid level sensor and to the actuator, the controller configured to move the gate valve from the open position to the closed position upon receipt of the signal from the sensor indicating liquid at the second predetermined level.

2. The valve assembly according to claim 1, wherein the valve body includes a gate guide located within the chamber and cooperating with the second wall to define a guide channel, the gate valve being located within the guide channel and being moveable therein relative to the gate guide between the open and closed positions.

3. The valve assembly according to claim 2, wherein the gate guide includes a closing guide, the closing guide defining a cam surface, the gate valve being in engagement with the cam surface in the closed position.

4. The backwater gate valve assembly according to claim 3, wherein the gate valve is supported in the chamber by an operating shaft, the operating shaft having a threaded terminal end and the gate valve being threadably engaged with the terminal end, the gate valve being rotationally limited in the guide channel, whereby the gate valve axially moves relative to the operating shaft between the open and closed positions upon rotation of the operating shaft.

5. The backwater gate valve assembly according to claim 4, wherein the linkage is drivingly coupled to the operating shaft.

6. The backwater gate valve assembly according to claim 1, further comprising a valve position sensor coupled to the controller.

7. The backwater gate valve assembly according to claim 6, wherein, the valve position sensor is configured to sense the gate valve in the open position and the closed position.

8. The backwater gate valve assembly according to claim 6, wherein the valve position sensor includes an upper valve position switch, a lower valve position switch and a switch position plate, the upper and lower valve position switches being fixedly mounted relative to the valve body and the switch position plate being moveable between the upper and lower valve position switches.

9. The backwater gate valve assembly according to claim 8, wherein the switch position plate is threadably engaged with a portion of the linkage and is non-rotatably coupled to the upper and lower switch position switches.

10. The backwater gate valve assembly according to claim 9, further comprising a support frame mounted to the drain body, the switch position plate being non-rotatably coupled to the frame.

11. The backwater gate valve assembly according to claim 9, wherein the non-rotatable coupling includes a projection of the switch position plate received within one of a slot and recess.

12. The backwater gate valve assembly according to claim 1, further comprising a valve obstruction sensor coupled to the controller, the valve obstruction sensor configured to detect an obstruction to movement of the gate valve between the open and closed positions to provide a signal to the controller in response to detecting the obstruction to movement.

13. The backwater gate valve assembly according to claim 12, wherein the valve obstruction sensor includes a clutch coupled to the linkage and a clutch position sensor, the clutch configured to permit relative rotational movement in the linkage in response to obstructed move of the valve gate between the open and closed positions and the clutch position sensor configured to provide a signal to the controller indicative of the relative movement in the linkage.

14. The backwater gate valve assembly according to claim 13, wherein the clutch includes a motor coupling and a valve coupling, the motor and valve couplings having engaged mating surfaces and being moveable in relative rotation.

15. The backwater gate valve assembly according to claim 14, wherein one of the motor and valve couplings is axially moveable and biased into engagement with the other of the motor and valve couplings.

16. The backwater gate valve assembly according to claim 15, wherein the one of the motor and valve couplings being axially moveable is non-rotationally engaged with a portion of the linkage.

17. The backwater gate valve assembly according to claim 16, wherein the portion of the linkage is a drive shaft coupled to the gate valve at a location between the gate valve and the clutch.

18. The backwater gate valve assembly according to claim 16, wherein the valve obstruction sensor further includes an upper clutch position switch, a lower clutch position switch and a clutch position plate, the clutch position plate being axially moveable with the one of the motor and valve couplings between engagement with the upper clutch position switch and engagement with the lower clutch position switch.

19. The backwater gate valve assembly according to claim 1, further comprising a manually operated actuator, the manually operated actuator also being configured to manually move the gate valve between the open and closed positions.

20. The backwater gate valve assembly according to claim 19, wherein the manually operated actuator is a hand wheel.

21. The backwater gate valve assembly according to claim 19, wherein the manually operated actuator couples the motor to the linkage and includes a manual operation clutch configured to engage and disengage the linkage with the motor.

22. The backwater gate valve assembly according to claim 21, wherein the manual operation clutch is spring biased and the manually operated actuator is axially moveable to disengage the manual operation clutch.

23. The backwater gate valve assembly according to claim 21, wherein manual operation clutch includes a T-slot and pin engagement between the linkage and the manually operated actuator.

24. The backwater gate valve assembly according to claim 1, further comprising a downstream fluid level sensor coupled to the controller and configured to detect the level of fluid downstream of the gate valve.

25. The backwater gate valve assembly according to claim 24, wherein the downstream fluid level sensor includes a pressure switch.

26. The backwater gate valve assembly according to claim 25, wherein the pressure switch is connected to the gate valve by a hollow tube coupled to a bore extending through the gate valve.

* * * * *